May 8, 1951

J. MIHALYI 2,552,200

LIGHT-TIGHT PHOTOGRAPHIC FILM CARTRIDGE

Filed Feb. 20, 1947

JOSEPH MIHALYI
INVENTOR

BY
ATTORNEYS

Patented May 8, 1951

2,552,200

UNITED STATES PATENT OFFICE 2,552,200

LIGHT-TIGHT PHOTOGRAPHIC FILM CARTRIDGE

Joseph Mihalyi, Rochester, N. Y., assignor to Eastman Kodak Company, Rochester, N. Y., a corporation of New Jersey Application February 20, 1947, Serial No. 729,760

9 Claims. (Cl. 242—71)

This invention relates to photography and more particularly to light-tight photographic film cartridges. One object of my invention is to provide a relatively-inexpensive film cartridge in which the film is protected against light without the usual interleaving film-backing paper. Another object of my invention is to provide a film cartridge which can be rapidly loaded into a camera and which can be readily removed from a camera while maintaining its light-tight condition. Another object of my invention is to provide a simple type of film support in which a reel and a spring light-protective member cooperate to form a light-tight housing for enclosing film. Other objects will appear from the following specification, the novel features being particularly pointed out in the claims at the end thereof.

Films, and particularly films designed for "miniature" cameras (by which I mean cameras utilizing film of 35 millimeters or less in width) are usually prepared by winding convolutions of film on a spool and by enclosing the spool in a retort which generally consists of a generally-cylindrical enclosure having caps on the end which have trunnions through which the film spool may turn, or be turned; the outside sheath having a pair of spaced lips faced with plush to provide a light-tight opening through which the film may pass to and from the retort. Such retorts are not only expensive but it is very seldom that a good light-tight passageway is provided for the film in practice and if any of the plush should come off on the film, it leaves imperfections which are very undesirable, particularly with film to be enlarged. Moreover, it is difficult to maintain retorts in production with sufficient accuracy to always permit the film spool to turn freely in the retort and if the retort is mishandled, it frequently is difficult, if not impossible, to load in cameras. My improved film cartridge is designed to overcome many of these difficulties. The present light-tight photographic film cartridge is particularly designed for use in my improved roll film camera shown in my copending application Serial No. 729,759, filed February 20, 1947.

Coming now to the drawings wherein like reference characters denote like parts throughout:

While I have shown and described a film cartridge designed for very narrow film, such as for 16 or 20-mm. film, it is obvious that it may be used for any film width, and it is particularly suitable for 35-mm. and even wider films, such as 2¼ x 3¼ film.

My invention comprises generally a film spool which is specially prepared for the purpose; this film spool having an interlocking engagement with a spring light-protective member which snugly engages the flanges of the spool to form a light-tight connection therewith. Convolutions of film, therefore, wound on the film spool hub are protected against light by this light-protective spring member and by the backing on the film, since the film is preferably the well-known type of "gray-backed" film; this gray backing being designed to reduce light passing through the film and to prevent halation, as is well known in the art.

Figure 4:
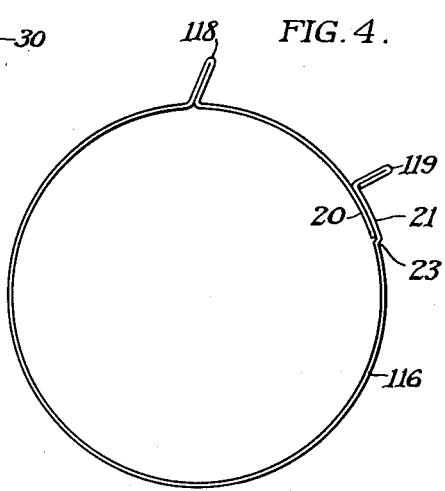
Fig. 4 is a section through the center part only of a film spool and showing a light-protective member in end elevation, the film spool flanges being omitted to more clearly show the construction of the protective cover.

More specifically, my invention consists of a film spool designated broadly as 1; this film spool including flanges 2 and a spring light-protective member 3 which, as best shown in Fig. 4, is of such a length that it completely encircles the film core 4 which supports the flanges 2.

Figure 5:
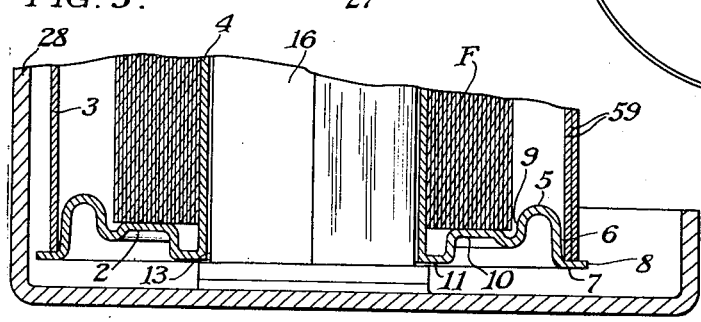
Fig. 5 is an enlarged fragmentary section taken on line 5—5 of Fig. 2.

The film spool hub 4, as best shown in Fig. 5, is a generally-tubular member and the flanges 3 are formed with annular ribs 5 projecting toward each other, these ribs preferably having a long shoulder 6 leading to a flat flange portion 7 extending outwardly to the periphery 8 of the spool flange to provide a shoulder against which the light-protective spring member 3 may rest. The annular ribs 5 also form a shoulder 9 against which the convolutions of film F may rest and, as shown in Fig. 5, the annular ribs 5 are closer together than the width of film F wound on the hub 4. The flanges are provided with annular rings 10 which support the convolutions of film F and which form the major flat portion of the flanges 2.

I prefer to emboss the central portions 11 of the flanges 2 and may provide openings 12 and 13 of different configuration in the two flanges. In the present instance, the configuration of the opening 12 is in the general shape of an elongated slot having a round central portion 14 so that this may receive the rounded end 15 of a shaft supporting the spool. The configuration 13 is preferably square so that it may rest on and be turned by a squared area 16 on the reel-supporting shaft. Obviously, any desired configurations can be used for this purpose.

The spring light-protective member 3 preferably consists of a spring metal sheet formed in a generally-cylindrical shape, as shown in Fig. 4, and provided with a pair of outwardly-extending handles 18 and 19. These handles are provided at or near the ends 20 and 21 of the spring member and are preferably made of a double thickness of metal as shown in Fig. 4, so that these handles are relatively rigid with respect to the spring member. The ends 20 and 21 are adapted to lie in overlapping position when the spring member engages the flanges 2 and I prefer to provide an offset 23, the thickness of the metal, so that the ends 20 and 21 will lie snugly against the periphery of the shoulders 6 of the flanges 2. The spring material is so arranged that the tendency of the spring member 3 is to move inwardly until the shoulders 6 of the flanges 2 are tightly engaged so that there is formed by this spring member and the two flanges a light-tight cartridge because the light is prevented from entering to the film F by the overlapping construction of the ends of the spring member by the shoulders 6 of the flanges 2 and by the annular rings 7 of the flanges 2.

In order to form an opening through which the film F may be propelled from the film cartridge to an exposure position in the camera and returned again to the spool after exposure in accordance with my Patents 2,336,278, December 7, 1943, and 2,364,381, December 5, 1944, I provide a means on the camera for opening the spring light-protective member after the cartridge has been inserted in the camera.

In order to do this, I have shown a typical camera 25 with a section 26 hinged by the hinge pintle 27 to move to and from its loading position. When the section 26 is swung outwardly, (this section being partially swung outwardly in Fig. 2), it exposes the top of a generally-cylindrical container 28 which carries a film-supporting post having a squared lower end 16 and a rounded top 15. The generally-cylindrical container 28 is provided with an opening 29 through which film may be moved and with two off-set portions 30 and 31. These are positioned to receive the handles 18 and 19 of the spring member 3 and in loading the film cartridge it is merely dropped into the cylindrical container 28 with the squared opening 13 downwardly positioned to engage the squared end of the shaft 16. The handles 18 and 19 slide into their respective grooves 30 and 31. The hinge section 26 may now be closed. In closing, an arm 33 on the camera, which is provided with a downwardly-extending nose 34, is so positioned that it may engage one of the handles 18. This engagement causes the spring protective member 3 to gradually move to open up the slot shown at 35 through which the film F may pass into the film-guiding chute C. However, this opening movement does not occur until the hinge portion 26 of the camera engages the body portion 25 and the mating flanges 36 and 37 become engaged so that the film F is always protected against light. The film may now be wound through the camera, exposed, and returned to the original reel and to reload, the hinge section 26 is swung outwardly upon the hinge pintle 27, thereby releasing the handle 18 from the nose 34 and permitting the spring member to close through the spring in the metal of which it is made. Thus, the spring protective cover 3 will return to its Fig. 2 position totally enclosing the film before the hinge door 26 is opened and, after it has been fully swung open, the cartridge may be axially slid outwardly and a fresh cartridge inserted.

Figure 1:
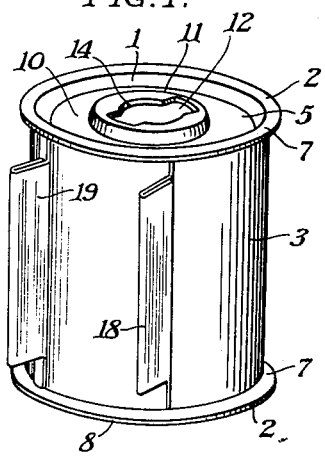
Fig. 1 is a perspective view of a film cartridge constructed in accordance with and embodying a preferred form of my invention.
Figure 2:
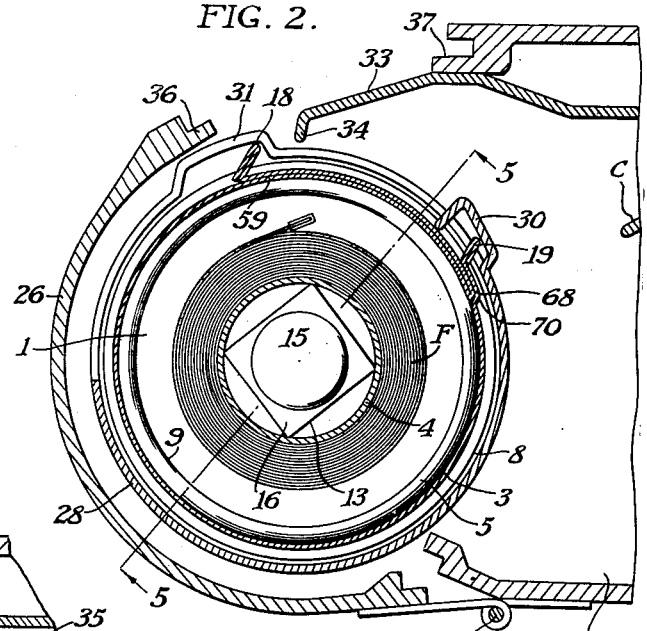
Fig. 2 is an enlarged sectional view taken through a camera and showing the film cartridge being loaded into a camera.
Figure 3:
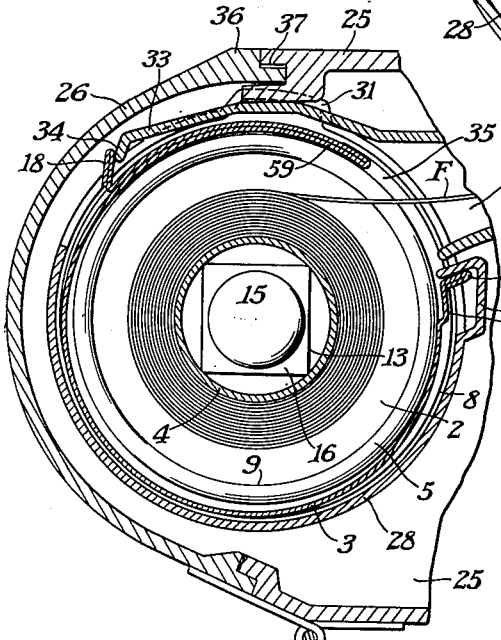
Fig. 3 is a view similar to Fig. 2 but with the film cartridge in a completely-loaded position.

There are many ways in which the spring member can be made as, for instance, in Figs. 2 and 3, this sheath may be made by providing a handle 18 on the end 59 of a double thickness of the material which is bent into a generally-cylindrical shape 60, the other end 68 being provided with a handle 19 formed of a double thickness of the end of the material of which it is made. A shoulder 70, in this instance, is equal to approximately two thicknesses of metal so as to receive the double thickness 59 of the first-mentioned end of this spring light-protective member. I have found that ordinary steel is satisfactory although, of course, this member can be made of spring bronze, or even of plastic material, although I have found that plastic material must generally be made of a fairly thick cross-section to insure proper operation and it generally has the disadvantage of not being as springy as a properly-constructed metal light-protective member. However, from the standpoint of my invention, it is immaterial of what material this spring light-protective member is made, so long as it has sufficient inherent spring to open up widely enough to provide a film passageway and to always close properly after the handles are released.

As shown in Fig. 4, a simpler spring member is shown as consisting of handles 118 and 119 made of a double thickness of material and bent from the spring band 116. The end 20 is overlapped by the offset 21 and normally abuts against shoulder 23.

It will readily be seen that the film cartridge, which has been described above, is extremely inexpensive to make, since it adds to the cost of a film spool only the cost of the spring light-protective member. Since this can be readily made of a punch-press part, it can be made extremely inexpensive. Tests have indicated that such film cartridges are even more light-tight than the known types of film retorts in the sizes tested and that they are far less expensive to make. Moreover, it permits the use of a "gray-backed" film of known types in which the gray backing readily comes off in the fluid-processing baths, so that the "jet back" film, which is more light impervious and considerably more difficult to handle, is not required to make a satisfactory light-tight film cartridge. Moreover, the film of this film cartridge is exceedingly easy to load to and from a camera by sliding the cartridge axially into place, as is more fully pointed out in my patents above referred to.

I claim:

1. A light-tight cartridge for light-sensitive photographic films comprising a spool including a hub with flanges on each end, said flanges including annular shoulders extending toward each other inside of the outer periphery of the flanges, said annular ribs being closer together than the width of a film adapted to be wound on the core, and a spring light-protective member of a width to pass between the flanges and to engage the outside of the annular ribs and of a length to encircle said spool and at least slightly overlap to form interengaging relatively slideable ends which coact to form a light-tight connection therewith.

2. A light-tight cartridge for light-sensitive photographic films comprising a spool including a hub with flanges on each end, said flanges including annular shoulders extending toward each other inside of the outer periphery of the flanges, said annular ribs being closer together than the width of a film adapted to be wound on the core, and a spring light-protective member of a width to pass between the flanges and to engage the outside of the annular ribs and of a length to encircle said spool and at least slightly overlap to form interengaging relatively slideable ends which coact to form a light-tight connection therewith, the spring light-protective member including handles on the ends thereof projecting outwardly therefrom to facilitate springing apart the overlapping interengaging relatively slideable ends of the light-protective member to permit passage of film therethrough.

3. A light-tight cartridge for light-sensitive photographic films comprising a spool including a hub with flanges on each end, said flanges including annular shoulders extending toward each other inside of the outer periphery of the flanges, said annular ribs being closer together than the width of a film adapted to be wound on the core, and a spring light-protective member of a width to pass between the flanges and to engage the outside of the annular ribs and of a length to encircle said spool and at least slightly overlap to form interengaging relatively slideable ends which coact to form a light-tight connection therewith, the spring light-protective member being made of metal and including handles extending outwardly from the ends thereof, said handles being formed of a double thickness of metal and constituting relatively rigid handles extending at least partially across the light-protective member for springing apart the relatively slideable ends to permit the passage of a film therethrough.

4. A light-tight cartridge for light-sensitive photographic films comprising a spool including a hub with flanges on each end, said flanges including annular shoulders extending toward each other inside of the outer periphery of the flanges, said annular ribs being closer together than the width of a film adapted to be wound on the core, the annular ribs lying inside the periphery of the flanges and forming a substantially right-angle shoulder therewith, and a spring light-protective member of a width to pass between the outer periphery of the flanges and to closely engage the flanges and to lie against the right-angle shoulders thereof and inside the periphery of the flanges, the length of the spring protective member corresponding to the circumference of the shoulder plus an overlap of the two ends to form interengaging relatively slideable ends which coact to form a light-tight connection therewith, and means carried by the spring light-protective member near the ends thereof to facilitate springing the interengaging relatively slideable ends of light-protective member apart to permit passage of a film therebetween.

5. The light-tight cartridge for a film cartridge as defined in claim 4 characterized by one of the overlapping ends of the spring protective member being provided with an offset in which the other end may lie whereby the entire area of the right angle flange may be engaged by the spring light-protective member.

6. A light-tight cartridge for light-sensitive photographic films comprising a spool including flanges carried by a hub, an annular shoulder extending about the periphery of each flange spaced from the outer periphery thereof, the shoulders extending toward each other, convolutions of film wider than the space between the shoulders on the flanges, said film convolutions normally lying between the shoulders and the hub, and a light-protective spring member encircling the convolutions of film and lying between the outer peripheries of the flanges and engaging the shoulders, said spring member including overlapping relatively slideable ends coacting with each other and the shoulders to form a substantially light-tight connection therewith, the ends of the light-protective spring member normally lying in engagement but being readily slideable from a position in which the ends coact to form a light-tight connection with the shoulders.

7. A light-tight cartridge for light-sensitive photographic films comprising a spool including flanges carried by a hub, an annular shoulder extending about the periphery of each flange and spaced from the peripheries of the flanges, the shoulders extending toward each other, convolutions of film wider than the space between the shoulders on the flanges, said film convolutions normally lying between the shoulders and the hub, and a light-protective spring member encircling the convolutions of film lying between the outer peripheries of the flanges and engaging the shoulders to form a substantially light-tight connection therewith, the ends of the light-protective spring member normally lying in engagement and being relatively slideable from a normal overlapping engagement, and means carried by the light-protective spring member for sliding the relatively movable ends thereof from their engaging position to a spaced position providing a slot through which film may pass.

8. A light-tight cartridge for light-sensitive photographic films comprising a spool including flanges carried by a hub, an annular shoulder extending about the flange and inside the periphery of each flange, the shoulders extending toward each other, convolutions of film wider than the space between the shoulders on the flanges, said film convolutions normally lying between the shoulders and the hub, and a light-protective spring member lying inside the peripheries of the flanges and encircling the convolutions of film and engaging the shoulders to form a substantially light-tight connection therewith, the ends of the light-protective spring member normally lying in engagement and being slideable one relative to the other, to move from an end coacting position to a position in which the ends are spaced, and flanges carried on the light-protective member for sliding the ends of the spring member to space the end thereof to permit the movement of film therethrough, said flanges extending outwardly between and beyond the outside peripheries of the film spool flanges.

9. A light-tight cartridge for light-sensitive photographic films comprising a spool including flanges carried by a hub, an annular shoulder extending about the flange and inside the periphery of each flange, the shoulders extending toward each other, convolutions of film wider than the space between the shoulders on the flanges, said film convolutions normally lying between the shoulders and the hub, and a light-protective spring member lying inside the periphery of the flanges and encircling the convolutions of film and engaging the shoulders to form a substantially light-tight connection therewith, the ends of the light-protective spring member normally lying in engagement but being readily slideable one over the other to provide a slot therebetween, and including outwardly-extending flanges to provide handles for sliding one relatively movable end with respect to the other for separating the flanges to provide a film slot.

JOSEPH MIHALYI.

REFERENCES CITED

The following references are of record in the file of this patent:

UNITED STATES PATENTS

| Number | Name | Date |
|---|---|---|
| 1,840,822 | Ross | Jan. 12, 1932 |
| 1,973,457 | Wittel | Sept. 11, 1934 |
| 2,236,917 | Pollock | Apr. 1, 1941 |
| 2,346,075 | Mihalyi | Apr. 4, 1944 |

FOREIGN PATENTS

| Number | Country | Date |
|---|---|---|
| 619,325 | Germany | Sept. 9, 1933 |